United States Patent [19]

Aymerich et al.

[11] Patent Number: 5,364,149
[45] Date of Patent: Nov. 15, 1994

[54] RETAINING SPRING FOR AUTOMOBILE SUNVISOR HINGES

[75] Inventors: José Aymerich; Jesûs Prat, both of Rubi, Spain

[73] Assignee: Industrias Techno-Matic, S.A., Barcelona, Spain

[21] Appl. No.: 924,012

[22] PCT Filed: Jan. 30, 1992

[86] PCT No.: PCT/ES92/00012
§ 371 Date: Sep. 18, 1992
§ 102(e) Date: Sep. 18, 1992

[87] PCT Pub. No.: WO92/14624
PCT Pub. Date: Sep. 3, 1992

[30] Foreign Application Priority Data

Feb. 15, 1991 [ES] Spain .............. P 9100402

[51] Int. Cl.$^5$ .............................................. B60J 3/02
[52] U.S. Cl. ............................ 296/97.12; 248/291; 16/342
[58] Field of Search ............... 296/97.9, 97.11, 97.12, 296/97.13; 248/291; 16/342

[56] References Cited

U.S. PATENT DOCUMENTS

| | | |
|---|---|---|
| 4,500,131 | 2/1985 | Fleming ........................ 296/97.12 |
| 4,617,699 | 10/1986 | Nakamura ....................... 296/97.9 |
| 4,702,513 | 10/1987 | Ebert et al. ..................... 296/97.9 |
| 4,828,313 | 5/1989 | Lanser et al. .................. 296/97.12 |
| 4,841,599 | 6/1989 | Cebollero ........................ 16/342 |

FOREIGN PATENT DOCUMENTS

| | | |
|---|---|---|
| 0099968 | 8/1984 | European Pat. Off. . |
| 398400 | 11/1990 | European Pat. Off. ..... 296/97.12 |
| 2551633 | 12/1977 | Germany . |
| 92014623 | 9/1992 | WIPO ........................ 296/97.12 |

*Primary Examiner*—Dennis H. Pedder
*Attorney, Agent, or Firm*—Michael J. Striker

[57] ABSTRACT

A retaining spring for automobile sun visor hinges has a body member which is symmetrical about a central plane and has one transverse side and two longitudinal sides. The one transverse side is provided with a longitudinal slot, while two longitudinal sides are provided with longitudinally arranged recesses and with inclined resilient tabs separated by a slot and insertable in a sun visor. The resilient tabs define an inner recess for grippingly receiving a pivot pin of a bent support of a sun visor. A remaining transverse side of the body member together with the two longitudinal sides defines a chamber for snugly receiving means setting a position occupied by a spring within the sun visor.

4 Claims, 1 Drawing Sheet

RETAINING SPRING FOR AUTOMOBILE SUNVISOR HINGES

BACKGROUND OF THE INVENTION

The present invention relates to a retaining spring for automobile sunvisor hinges which can hold any position among possible positions selected by a user.

It is well known that the sunvisor hinges normally fitted as a original equipment in automobiles comprise, in essence, a body member defined by the frame of the sunvisor or attached to said frame, and also attached to a retaining spring in such a way that said body member and retaining spring cooperate to receive a pivot pin of the bent support attached to the automobile structure.

The above described unit allows the sunvisor to occupy any position among those which are regularly used. The position occupied by the sunvisor is held by the gripping action of the retaining spring on the pivot pin of the bent support. Thereby are the vibration caused by the vehicle when being driven are from causing untimely movement of the sunvisor.

Generally the retaining spring and the pivot pin of the bent support are provided with corresponding mechanical means, which usually consist of positioning flats formed on said spring and pivot pin, and allow the rest positions of the sunvisor to be held more firmly.

In this way, the sunvisor hinge retaining spring applies pressure in two well differentiated ways to the pivot pin of the bent support. On the one hand, there is a first type of pressure for the sunvisor positions other than the rest positions and, on the other hand, a second type of pressure for the sunvisor rest positions. Thus, the passage of the sunvisor from the rest positions to any other position and vice versa, which passage hereinafter with regard to the retaining spring will be called working cycle, subjects the retaining spring to repeated resilient deformation which causes fatigue of the component material thereof, generally steel. This fatigue of the material causes a loss of resilience in the retaining spring and consequently a slackening of the grip on the pivot pin of the bent support. Thereby, under these conditions, the position occupied by the sunvisor becomes unstable and the vibrations of the vehicle when being driven cause untimely movement of the sunvisor which, apart from being troublesome, may cause situations of danger.

As examples of known of retaining springs for automobile sunvisors, there may be cited Spanish utility model number 292644, equivalent to U.S. Pat. No. 4,778,160, and Spanish patent number P 8900980, both having as title "Spring for automobile sunvisor hinges". In Spanish utility model number 292644, the retaining spring consists of a steel leaf, which is formed as a quadrangular prism having rounded edges, with one of the sides acting as a flexible wing pressing on the pivot pin of the bent support. In Spanish patent number P 8800980, the retaining spring consists of a steel sheet which is formed with four essentially rectangular tabs, with one tab extended with a curved extension defining a housing for the said pivot pin and gripped by said tabs and curved extension.

In the known sunvisor hinge springs the operative reliability is limited by a low number of working cycles after which they break or lose resilience and consequently slacken their grip on the pivot pin of the bent support, causing untimely release of the sunvisor.

SUMMARY OF THE INVENTION

In keeping with these objects and with others which will become apparent hereinafter, one feature of the present invention resides, briefly stated, in a sun visor hinge spring which has extended useful life with a larger capacity of absorption of repeated resilient deformation to which it is subjected.

The retaining spring of the invention is a one-piece member formed from highly flexible materials preferably from a quadrangular metal sheet and characterized in that it is formed with a body member having an essentially quadrangular prismatic form with rounded edges and is symmetrical about its center plane, the said body member being provided, on one of the sides thereof, with a slot extending longitudinally and centrally coextensive therewith, and on the two sides forming a dihedral with the former one, respective longitudinally arranged recesses coextensive with the body member and formed with respective flexible tabs having an essentially rectangular surface and converging towards the said center plane, said resilient tabs internally defining corresponding positioning flats and an essentially trapezial housing for grippingly receiving the pivot pin of the bent support, with the remaining side of the body member and those forming a dihedral therewith defining a housing for snugly receiving the means setting the position occupied by the spring within the sunvisor.

When the automobile sunvisor hinge is designed in accordance with the present invention it eliminates the disadvantages of the prior art in a limited capacity of absorption of resilient deformation caused during successive working cycles, i.e., the passage from the rest positions to any other position and vice versa.

With the pivot pin of the bent support being inside the trapezial housing defined by the said resilient tabs, the features of the retaining spring of the invention allow the resilient deformation undergone by the spring during the working cycle to produce tensile-compression stress in the constituent material of the spring which is substantially lower than the stress to which the springs are subjected in the known hinges in which said stresses fall basically on a small area and in particular on a single resilient leaf. As result of the foregoing, under the regular conditions of use, the retaining spring of the invention may be subjected to a large number of working cycles, which is very much higher than the number of cycles to which the springs of the known hinges may be subjected, without breaking and without suffering from a noticeable loss of resilience.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
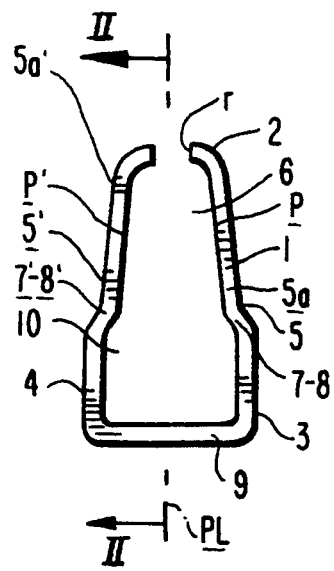
FIG. 1 is a front view of the spring of the invention.
Figure 2:
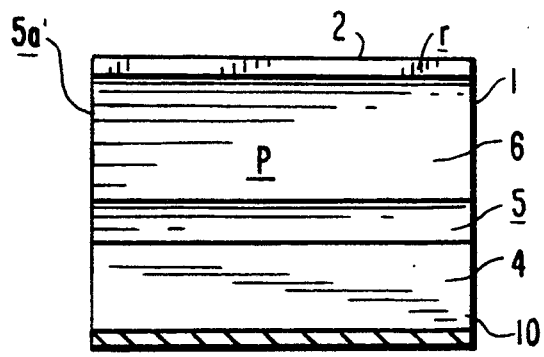
FIG. 2 is a cross-section view on the line II—II of FIG. 1.

A retaining spring for automobile sunvisor hinges in accordance with the present invention is shown in FIGS. 1 and 2 and has a body member 1 which is a one-piece member. It is preferably formed from a metal sheet of uniform thickness and high resilience, particularly steel, having a quadrangular profile.

FIG. 1 shows how the body member 1 is essentially quadrangularly prismatic with rounded side edges. It is symmetrical about the longitudinal center plane PL which, in FIG. 1, coincides with the section line referenced as II—II.

The side 2 of the body member 1, which relative to FIG. 1 is the upper side, is provided with the longitudinal slot r which is coextensive with the body member 1.

The sides 3 and 4 of the body member 1 form a dihedral with the said side 2. They provided respectively with the longitudinal recesses 5 and 5' which, coextensive with the body member 1 and formed with corresponding resilient tabs 5a and 5a. The tabs as shown in FIG. 2, are essentially rectangular and define inside the body member 1, respective positioning flats P and P'.

FIG. 1 shows how the resilient tabs 5a and 5a' converge slightly towards the longitudinal center plane PL so that the resilient tabs 5a and 5a and the side 2 of the body member 1 define an essentially trapezial chamber 6. The short side of the body member consists of the side 2 formed with the slot r.

FIG. 1 shows how the recess 5 forms on the side 3 of the body member 1 two adjacent curved longitudinal portions 7 and 8 which, internally and externally, define corresponding concave and convex surfaces connecting the resilient tab 5a with the lower portion of the side 3. In a similar way, the resilient tab 5a' is connected to the lower portion of the side 4 of the body member 1 by the curved portions 7' and 8'.

In the body member 1 the side 9 opposite to the side 2, and the sides 3 and 4 together forming a dihedral define the chamber 10. As shown in FIG. 1, it is adjacent to the trapezial housing 6 defined by the resilient tabs 5a and 5a'.

Figure 3:
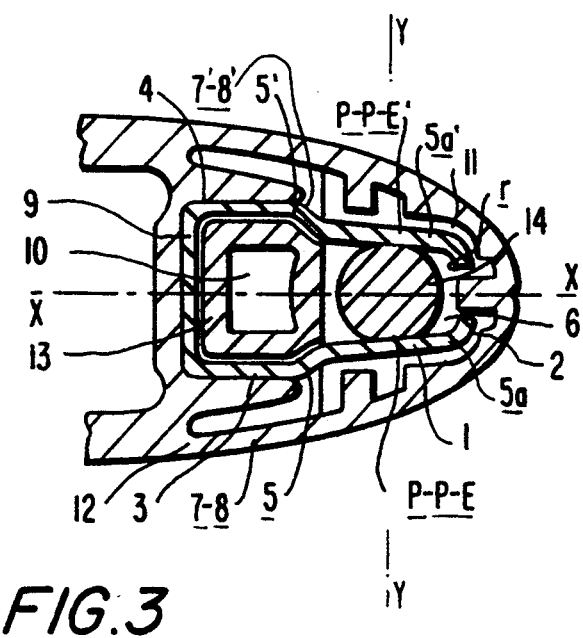
FIG. 3 is a cross-section view showing the action of the spring of the invention on the pivot pin of the bent support when the sunvisor is in the rest position.
Figure 4:
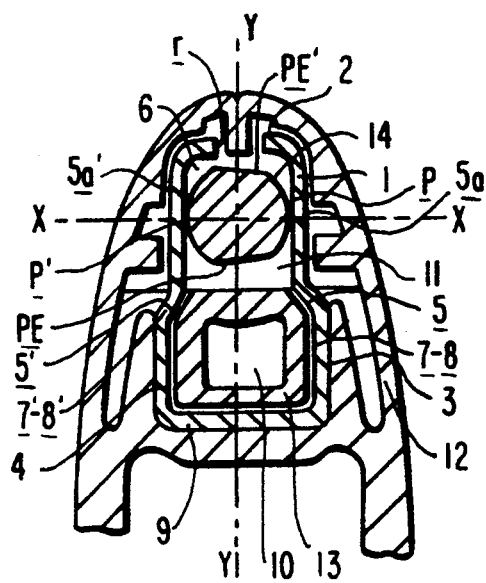
FIG. 4 is a cross-section view showing the action of the spring of the invention on the said pivot pin when the sunvisor is in a position other than the rest position.

FIGS. 3 and 4 show how in this embodiment the body member 1 forming the retaining spring of the invention is housed in the cavity 11. The cavity is formed in the frame 12 of the sunvisor which, for greater clarity of disclosure, has been shown in part in FIGS. 3 and 4.

In order to set the position occupied by the body member 1 in the cavity 11, the frame 12 of the sunvisor is formed with the prismatic extension 13 which, as shown in FIGS. 3 and 4, is snugly located in the chamber 10 defined by the sides 3, 4 and 9 of the body member 1. Once the body member 1 has been fitted to the frame 12 of the sunvisor, the cavity 11 and the prismatic extension 13 act in such a way that the resilient tabs 5a and 5a' may rotate to a relatively small extent around the recesses 5 and 5' respectively.

For similar reasons the bent support has not been shown in full in the Figures of the drawing sheet; in FIGS. 3 and 4 show the cross-section of the pivot pin 14 of the bent support and on which the sunvisor may rotate between the regular positions of use.

FIG. 4 shows how the pivot pin 14 is formed with the positioning flats PE and PE' which, diametrically arranged, are slightly convergent. In this embodiment, said positioning flats PE and PE' define a single rest position for the sunvisor. The pivot pin 14 of the bent support may be formed with a larger number of positioning flats and consequently, define a larger number of rest positions for the sunvisor.

FIGS. 3 and 4 show how the body member 1 is housed in the cavity 11 of the frame 12 of the sunvisor and the pivot pin 14 of the bent support is disposed in the trapezial chamber 6 defined by the resilient tabs 5a and 5a' of the body member 1. The retaining spring of the invention operates as follows:

FIG. 3 shows the rest position occupied by the sunvisor. In this position the positioning flats E and P' of the resilient tabs 5a and 5a' of the body member 1 press respectively on the positioning flats PE and PE' of the pivot pin 14 of the bent support, and said pressure prevents untimely release of the sunvisor under normal conditions of use.

FIG. 4 shows a position occupied by the sunvisor other than the rest position. To attain this position, the user must apply two different and well differentiated moments of rotation to the sunvisor. The first moment overcomes the antagonist moment generated by the resilient tabs 5a and 5a', through the positioning flats P, P', when they press against the positioning flats PE and PE', respectively, of the bent support pivot pin 14, all as shown in FIG. 3. The second moment which is weaker than the first overcomes the friction generated by the pressure which said positioning flats E and P' of the resilient tabs 5a and 5a' exert on the curved surface of the pivot pin 14. Said pressure in a similar way as happens when the sunvisor is in the rest position detailed in FIG. 3, prevents untimely release of the sunvisor under normal conditions of use.

FIGS. 3 and 4 show the resilient deformation to which the body member 1 is subjected during the passage of the sunvisor from the rest position to any other different position and vice versa. The tensile-compression stress caused by said resilient deformation act basically on the adjacent curved portions 7-8 and 7'-8' of the recesses 5-5', respectively, of the body member 1. This involves a substantially lower material fatigue than the known embodiments of retaining springs, and leads to a larger number of working cycles without risk of breakage and without appreciable loss of resilience.

We claim:

1. A retaining spring for automobile sun visor hinges comprising a body member symmetrical about a center plane, said body member having one transverse side and two longitudinal sides, said one side being provided with a slot extending longitudinally and centrally coextensive with said one side, said two sides being provided with longitudinally arranged recesses coextensive with said sides and being formed with inclined resilient tabs which are converging toward said center plane, separated by said slot and flexible inside a sun visor within a range between said body and a pivot pin of a bent support of a sun visor, said resilient tabs being internally provided with positioning flats, said resilient tabs of said body member defining therebetween an inner recess for grippingly receiving the pivot pin of the bent support of a sun visor, said body member having a remaining transverse side which together with said two longitudinal sides define a chamber for snugly receiving means setting a position occupied by the spring within the sun visor.

2. A retaining spring as defined in claim 1, wherein said body member is formed of a metal sheet.

3. A retaining spring as defined in claim 1, wherein said flexible tabs have a substantially rectangular surface.

4. A retaining spring as defined in claim 1, wherein each of said two sides has another portion which is straight, and a curved portion connecting a respective one of said resilient tabs to said straight portion.

* * * * *